United States Patent
Lin et al.

(10) Patent No.: US 10,280,370 B2
(45) Date of Patent: May 7, 2019

(54) ONE-POT LIQUEFACTION PROCESS FOR BIOMASS

(71) Applicant: Beijing Huashi United Energy Technology and Development Co., Ltd., Beijing (CN)

(72) Inventors: Ke Lin, Beijing (CN); Lin Li, Beijing (CN); Lixin Guo, Beijing (CN); Yongjun Cui, Beinjing (CN); Lilong Jiang, Beijing (CN)

(73) Assignee: Beijing Huashi United Energy Technology and Development Co., Ltd, Beijing (CN)

( * ) Notice: Subject to any disclaimer, the term of this patent is extended or adjusted under 35 U.S.C. 154(b) by 0 days.

(21) Appl. No.: 15/795,319

(22) Filed: Oct. 27, 2017

(65) Prior Publication Data

US 2018/0142160 A1    May 24, 2018

(30) Foreign Application Priority Data

Nov. 21, 2016    (CN) .......................... 2016 1 10439103

(51) Int. Cl.
C10G 1/06    (2006.01)

(52) U.S. Cl.
CPC ........ C10G 1/06 (2013.01); *C10G 2300/1014* (2013.01); *C10G 2300/202* (2013.01); *Y02P 30/20* (2015.11)

(58) Field of Classification Search
CPC ............... C10G 1/06; C10G 1/00; C10G 3/50
USPC ........................................................ 585/242
See application file for complete search history.

(56) References Cited

U.S. PATENT DOCUMENTS

| | | | |
|---|---|---|---|
| 2009/0326285 A1 | 12/2009 | Bauer et al. | |
| 2011/0167713 A1* | 7/2011 | Quignard | C10G 1/08 44/307 |
| 2014/0096438 A1* | 4/2014 | Lange | B01J 37/0242 44/307 |

FOREIGN PATENT DOCUMENTS

| | | | | |
|---|---|---|---|---|
| CN | 1307926 | A | | 8/2001 |
| CN | 201351763 | Y | | 11/2009 |
| CN | 102127462 | A | | 7/2011 |
| CN | 102310005 | A | | 1/2012 |
| CN | 103242871 | A | * | 8/2013 |
| CN | 104096563 | A | * | 10/2014 |
| CN | 204051658 | U | | 12/2014 |
| CN | 104388117 | A | | 3/2015 |
| CN | 104588079 | A | | 5/2015 |
| CN | 204752627 | U | | 11/2015 |
| WO | WO-2009146225 | A1 | | 12/2009 |
| WO | WO-2012140333 | A1 | | 10/2012 |
| WO | WO-2015145279 | A1 | * | 10/2015 ................ C10L 1/02 |

OTHER PUBLICATIONS

Zhang, D. (Machine translation of CN103242871, pp. 1-10). (Year: 2013).*
Meier, D., et. al. "Effect of hydrogen pressure on yields and quality of oils obtained from direct liquefaction of pine wood", Elsevier Appl. Sci. Publishers London New York, (1989); pp. 584-592. (Year: 1989).*
Toritimber ("Saw Dust" (May 15, 2016)). (Year: 2016).*
MMCC ("Mesh to Micron Conversion Chart"; pp. 1-8, (May 3, 2008)) (Year: 2008).*
Li (Machine translation of CN 104096563) (Year: 2014).*

* cited by examiner

*Primary Examiner* — Philip Y Louie
*Assistant Examiner* — Aaron W Pierpont
(74) *Attorney, Agent, or Firm* — Harness, Dickey & Pierce, P.L.C.

(57) ABSTRACT

A one-pot liquefaction process for biomass is presented. The one-pot liquefaction process for biomass comprises the following steps: preparing a slurry containing a catalyst, a vulcanizing agent and a biomass, and introducing hydrogen into the slurry to carry out a reaction, thereby obtaining a bio-oil wherein the reaction is controlled to be carried out under a pressure of 13-25 MPa and a temperature of 300-500° C.; and the catalyst comprises amorphous alumina or biomass charcoal loading an active component, and the active component comprises one or more selected from oxides of metals of group VIB, group VIIB or group VIII in the periodic table of elements. The process provided by the present invention has high reaction efficiency, no coke formation and high liquid yield.

28 Claims, No Drawings

ONE-POT LIQUEFACTION PROCESS FOR BIOMASS

CROSS-REFERENCE TO RELATED APPLICATIONS

This application claims priority to Chinese Serial No. 201611043910.3 filed Nov. 21, 2016. The entire disclosure of the above application is incorporated herein by reference.

FIELD

The present invention relates to the technical field of biological energy conversion, and particularly to a one-pot liquefaction process for biomass.

BACKGROUND

With rapid development of the social economy, the fossil non-renewable energy, such as coal, crude oil, natural gas, oil shale and the like, is exhausted day by day, and environmental pollution caused by contaminants, such as $CO_2$, $SO_2$, $NO_x$ and the like, generated after the fossil non-renewable energy is burnt, is serious day by day, so that the human beings have to seriously consider energy access ways and environment improvement methods. A biomass is a renewable energy, which has huge potential and advantages in the aspects of meeting energy demands, reducing environment pollution and improving an energy structure. The biomass means all organic substances formed by directly or indirectly using the photosynthesis of green plants, including plants, animals, microorganisms and excretions and metabolites thereof, and the biomass has renewability, low pollution and wide distributivity. In recent years, conversion and utilization of the biomass energy are developed in directions of high efficiency and cleanness, wherein a biomass liquefaction process is an important part. The existing biomass liquefaction process are mainly divided into indirect liquefaction and direct liquefaction, wherein the direct liquefaction is to directly liquefy a biomass from a solid to a liquid under a suitable temperature and a suitable pressure by carrying out hydrolysis and supercritical liquefaction or introducing hydrogen, inert gas and the like under the action of a solvent or a catalyst. The biomass direct liquefaction process mainly comprises pyrolysis liquefaction, catalytic liquefaction, pressurized hydroliquefaction and the like, wherein especially products of pressurized hydroliquefaction have high yield and good quality, but the pressurized hydroliquefaction has harsh high-pressure liquefaction reaction conditions, and the pressurized hydroliquefaction further comprises very complex working procedures, such as solid material drying, crushing, slurry preparing, heating, pressurizing, reacting, separating and the like. For example, Chinese patent CN103242871A discloses a heavy oil and biomass hydrogenation co-liquefaction treatment process, and the process comprises the steps of pre-crushing a dried biomass to be 40-100-mesh, mixing the pre-crushed biomass of 40-100-mesh with a heavy oil to form a slurry, adding a catalyst and a vulcanizing agent into the slurry, placing the mixture in a slurry bed hydrogenation reactor to undergo a hydrogenation and thermal cracking reaction, wherein the reaction is controlled to be carried out under a temperature of 370-430 DEG C. and a partial pressure of hydrogen of 4-8 MPa, and fractioning the reaction product, thereby obtaining a bio-oil and coke.

Although the above-mentioned process can improve the conversion rate of the biomass to 90 wt % or above and the yield of an oil phase to 70 wt % or above, the process is relatively higher in reaction temperature and relatively smaller in partial pressure of hydrogen, thereby causing relatively lower efficiency of reactions, such as hydrolysis, cracking, hydrogenation and the like, finally causing a relatively larger rate of coke formation, and definitively causing a low yield of a liquid phase. Therefore, a technical problem to be urgently solved by those skilled in the art is to improve the existing biomass liquefaction process so as to overcome the defects of low reaction efficiency and a large rate of coke formation.

SUMMARY

Therefore, a technical problem to be solved in the present invention is to overcome the defects that in a conventional biomass liquefaction process, reactions of hydrolysis, cracking and hydrogenation are incomplete and coke polycondensation is severe, and the present invention provides a one-pot liquefaction process for biomass, which has high reaction efficiency, no coke formation and high liquid yield.

In order to solve the technical problem described above, a technical solution adopted by the present invention is as follows.

A one-pot liquefaction process for biomass comprises the following steps:
  preparing a slurry containing a catalyst, a vulcanizing agent and a biomass, and introducing hydrogen into the slurry to carry out a reaction, wherein the reaction is controlled to be carried out under a pressure of 13-25 MPa and a temperature of 300-500 DEG C., thereby obtaining a bio-oil.
The catalyst comprises
amorphous alumina loading a first active component, or biomass charcoal loading the first active component,
  wherein the first active component comprises one or more selected from oxides of metals of group VIB, group VIIB or group VIII in the periodic table of elements.
The catalyst further comprises
amorphous iron oxyhydroxide, and/or
biomass charcoal loading a second active component,
  wherein the second active component comprises one or more selected from oxides of Mo, W, Fe, Co, Ni and Pd; and
  said catalyst can be either independently used or used in combination, and when the catalyst used in combination, a mass ratio of the iron oxyhydroxide to the biomass charcoal loading the second active component is 0.5-5.

The vulcanizing agent in the present invention specifically may be sulfur, and may also be dimethyl sulfide, but not limited thereto. Any compound capable of converting the active component in the catalyst from oxides into corresponding sulfides can be taken as the vulcanizing agent in the present invention. In the present invention, the vulcanizing agent is in an amount of 4-10 wt % of the mass of the catalyst.

The slurry has a biomass content of 10-50 wt %, preferably 30-40 wt %.

The slurry has a catalyst content of 1-10 wt %, preferably 1-4 wt %, of the mass of the biomass; and the catalyst has a particle size of 5-500 microns.

The slurry is prepared by:
  separately adding the catalyst and the vulcanizing agent into a liquid biomass to form the slurry, wherein the liquid biomass comprises one or more selected from a group consisting of vegetable oil, animal oil, gutter oil and animal wastes; or drying a solid biomass to produce a dried solid biomass, crushing the dried solid biomass to produce a crushed solid biomass, removing dust from the crushed solid biomass to produce a de-dusted solid biomass, and mixing the de-dusted solid biomass with the catalyst and the vulcanizing agent to obtain a mixture; and adding the mixture to an oil product, thereby forming the slurry, wherein the oil product comprises one or more selected from a group consisting of vegetable oil, animal oil, coal tar, petroleum and the bio-oil prepared by the process.

Raw materials of the solid biomass in the present invention may be straw of crops, such as wheat, rice, corn, cotton and the like, may also be industrial crops, such as reed, pennisetum sinese, trees, tree leaves, melons, fruits, vegetables and the like, and further may be algae, industrial wood and paper wastes and the like; and the raw materials of the solid biomass may be one biomass and may also be a biomass raw material mixture consisting of various biomasses.

The dried solid biomass has a moisture content of 3-15 wt %, preferably 5-10 wt %; and the crushed solid biomass has a particle size of 1-5,000 microns, preferably 20-1,500 microns.

Said introducing hydrogen is carried out by:

injecting high-pressure hydrogen into the slurry till the volume ratio of the high-pressure hydrogen to the slurry is (600-1,000):1; thereby obtaining a reaction raw material mixture; and heating the reaction raw material mixture to 320-450 DEG C., feeding the heated reaction raw material mixture into a slurry bed reactor to undergo hydrolysis, cracking and hydrogenation reactions, and meanwhile, injecting cold hydrogen into the slurry bed reactor, wherein a total gas speed in the slurry bed reactor is controlled within 0.02-0.2 m/s, preferably 0.05-0.08 m/s;

wherein the high-pressure hydrogen has a pressure of 13-27 MPa, and the cold hydrogen has a temperature of 60-135 DEG C.

Said injecting the high-pressure hydrogen into the slurry includes two steps of:

injecting the high-pressure hydrogen into the slurry for the first time till the volume ratio of the high-pressure hydrogen to the slurry is (50-200):1, and heating the slurry to 200-350 DEG C., and injecting the high-pressure hydrogen into the slurry for the second time.

The cold hydrogen is injected via 3-5 injection ports which are sequentially formed in a height direction in a side wall of the slurry bed reactor.

The catalyst stored in the slurry bed reactor is controlled in an amount of 5-30 wt % of the mass of liquid in the slurry bed reactor; and the reaction is carried out for a period of 15-90 min.

A preparation method for the biomass charcoal loading the second active component comprises the steps of:

S1, carrying out acidification or alkalization on carbonized biomass charcoal to produce a biomass charcoal support; and S2, mixing the second active component and the biomass charcoal support, followed by grinding to produce the biomass charcoal loading the second active component.

The second active component comprises one selected from oxides of Mo, W, Fe, Co, Ni and Pd, and based on mass of metal elements, the second active component accounts for 1-5 wt % of the mass of the second biomass charcoal support.

Said step of mixing the second active component and the second biomass charcoal support, followed by grinding comprises the step of: carrying out vibration grinding and/or plane grinding and/or ball milling on the second active component and the second biomass charcoal support, thereby obtaining the biomass charcoal loading the second active component and having a particle size of 5-500 microns.

During said acidification, an acid medium has an amount-of-substance concentration of $H^+$ of 0.5-5 mol/L, the volume ratio of the carbonized biomass charcoal to the acid medium is (1:5)-(1:15), and the acidification is carried out at a temperature of 30-80 DEG C. for a period of 1-10 hours; and during said alkalization, an alkaline medium has an amount-of-substance concentration of $OH^-$ of 0.5-5 mol/L, the volume ratio of the carbonized biomass charcoal to the alkaline medium is (1:5)-(1:15), and the alkalization is carried out at a temperature of 30-80 DEG C. for a period of 1-10 hours.

The above technical solution of the present invention has the following advantages.

1. The one-pot liquefaction process for biomass provided by the present invention comprises the steps of: firstly preparing the slurry including the catalyst, the vulcanizing agent and the biomass, and introducing hydrogen into the slurry to carry out a reaction, wherein the reaction is controlled to be carried out under a pressure of 13-25 MPa and a temperature of 300-500 DEG C., thereby obtaining a bio-oil; and according to the process of the present invention, the biomass is subjected to a high-pressure high-temperature hydrolysis reaction in the presence of an appropriate amount of water (namely water contained in the biomass), and a hydrolysis product further undergoes cracking and hydrogenation reactions under the action of hydrogenation and a catalyst, namely amorphous alumina loading oxides of metals of group VIB, group VIIB or group VIII, thereby implementing conversion from the biomass to the bio-oil. In the process provided by the present invention, the conversion ratio of the biomass is up to 90-100%, the yield of the bio-oil is 60-86% or more, and the rate of coke formation is lower than 0.1%.

2. In the one-pot liquefaction process for biomass provided by the present invention, the catalyst is preferably a composite catalyst of amorphous alumina or biomass charcoal loading oxides of metals of group VIB, group VIIB or group VIII and amorphous iron oxide, and the catalyst has the advantages that a vulcanized noble metal has relatively better hydrogenation performance and can prevent coke from forming, the biomass charcoal or the amorphous alumina has acidity and a cracking function, and the amorphous iron oxide has alkalinity, can facilitate biomass hydrolysis, and also has a catalytic hydrogenation function after iron is vulcanized, thereby reducing consumption of the noble metal.

3. In the one-pot liquefaction process for biomass provided by the present invention, when the biomass raw material is solid, the solid biomass firstly needs to be subjected to pretreatment, such as drying, crushing, dust-removing and the like, to obtain a pretreated solid biomass, and then the pretreated solid biomass is mixed with the catalyst so as to greatly utilize the surface of biomass powder and help the catalyst to attach to the surface of the solid biomass powder, so that the catalyst can timely provide hydrogen transfer for the biomass hydrolysis product; therefore, it is ensured that no coke polycondensation occurs in the whole procedure of the one-pot liquefaction process for biomass, and a purpose of reducing the rate of coke formation is achieved.

4. The one-pot liquefaction process for biomass provided by the present invention utilizes the slurry bed reactor, wherein the reaction raw material mixture is fed into the slurry bed reactor via the bottom of the reactor to carry out a reaction, and meanwhile, the cold hydrogen is injected into the reactor, so that flow rate difference control of each phase state is implemented in the reactor depending on different specific weights of gas, liquid and solid materials and by matching with specific weight difference variation caused by the yield of a reacted light oil product, and then the biomass raw material mixture undergoes the hydrolysis, cracking and hydrogenation reactions in the reactor from bottom to top; in such procedures, even though the biomass with a large specific weight and the catalyst solid particles with a large specific weight ascend along with the gas and the light oil product, the ascended biomass and catalyst solid particles return to the bottom of the reactor under the action of the upper-part cold hydrogen to undergo the reactions again, and the content of the hydrogen in the slurry and the injection amount of the cold hydrogen in the reactor are suitably adjusted according to the densities of materials in the upper part, middle part and lower part of the reactor, thereby implementing circulation of an unconverted biomass in the reactor and balance discharge of the catalyst; therefore, the reactions of hydrolysis, cracking, hydrogenation and the like are guaranteed to be carried out completely, which facilitates improvement on the conversion ratio of the biomass and the yield of the bio-oil.

5. In the one-pot liquefaction process for biomass provided by the present invention, the high-pressure hydrogen is injected into the slurry in the two steps, that is, the high-pressure hydrogen is injected once before and after the slurry is heated, respectively, and the former injection of the high-pressure hydrogen can improve perturbation of the slurry in a heat exchanger, thereby avoiding deposition of the solid biomass and the catalyst.

DETAILED DESCRIPTION

Example embodiments will now be described more fully with reference to the accompanying drawings.

The technical solution of the present invention is described below clearly and completely. Apparently, the embodiments described below are a part, but not all, of the embodiments of the present invention. All other embodiments, obtained by those of ordinary skill in the art based on the embodiments of the present invention without any creative efforts, fall into the protection scope of the present invention. In addition, technical features involved in various implementations of the present invention described below can be combined with each other as long as they do not conflict with each other.

Embodiment 1

A preparation method for a second catalyst is provided by this embodiment, comprising the following steps:

S1, carbonized biomass charcoal undergoes acidification or alkalization, thereby obtaining a second biomass charcoal support; specifically, during said acidification, an acid medium has an amount-of-substance concentration of $H^+$ of 5 mol/L, the volume ratio of the carbonized biomass charcoal to the acid medium is 1:15, and the acidification is carried out at a temperature of 80 DEG C. for a period of 10 hours; and during said alkalization, an alkaline medium has an amount-of-substance concentration of $OH^-$ of 0.5 mol/L, the volume ratio of the carbonized biomass charcoal to the alkaline medium is 1:5, and the alkalization is carried out at a temperature of 30 DEG C. for a period of 10 hours; and S2, a second active component and the second biomass charcoal support undergo vibration grinding and/or plane grinding and/or ball milling, thereby obtaining a second catalyst with a particle size of 100-200 microns. The second active component comprises oxides of Mo and W, and based on mass of metal elements, the second active component accounts for 5 wt % of the mass of the second biomass charcoal support.

Embodiment 2

A one-pot liquefaction process for biomass, provided by this embodiment, comprises the following steps:

(1) corn straw is fed into a drier to be dried to produce dried corn straw with a moisture content of 3 wt %, the dried corn straw is crushed in a crusher to produce crushed corn straw with a particle size of 1-50 microns, and dust is removed from the crushed corn straw to produce straw particles;

(2) amorphous alumina (which has a particle size of 5-50 microns) loading a Mo oxide and a Co oxide, the straw particles in the step (1) and sulfur are uniformly mixed according to a mass ratio of 5:100:0.3, thereby obtaining a mixture; and the mixture is added into medium/low temperature coal tar, thereby obtaining a slurry with a biomass content of 10 wt %; and (3) hydrogen with a pressure of 13 MPa and a temperature of 60 DEG C. is injected into the slurry for the first time till the volume ratio of the high-pressure hydrogen to the slurry is 50:1, the slurry is heated to 200 DEG C. in a heat exchanger, and hydrogen with a pressure of 13 MPa and a temperature 200 DEG C. is injected into the slurry for the second time till the volume ratio of the twice injected hydrogen to the slurry reaches 800:1, thereby forming a reaction raw material mixture; the reaction raw material mixture is heated to 450 DEG C. and then is fed into a slurry bed reactor to undergo hydrolysis, cracking and hydrogenation reactions under a pressure of 13 MPa and a temperature of 500 DEG C., and in such reacting procedure, cold hydrogen with a temperature of 105 DEG C. is injected via three injection ports which are sequentially formed in a height direction in a side wall of the slurry bed reactor, wherein a total gas speed in the slurry bed reactor is controlled at 0.02 m/s, and the catalyst stored in the slurry bed reactor is controlled in an amount of 30 wt % of the total mass of the liquid phase and the solid phase in the slurry bed reactor; after the reactions are carried out for 90 min, materials discharged from the slurry bed reactor are fed into a separation system to undergo gas, liquid and residue separation, thereby obtaining a biomass gas, a bio-oil and residues, respectively; and the hydrogen in the reaction system is recycled and is fed into each hydrogen injection site in the step (3) together with fresh supplementary hydrogen.

Embodiment 3

A one-pot liquefaction process for biomass, provided by this embodiment, comprises the following steps:

(1) reeds are fed into a drier to be dried to produce dried reeds with a moisture content of 5 wt %, the dried reeds are crushed in a crusher to produce crushed reeds with a particle size of 20-1,000 microns, and dust is removed from the crushed reeds to produce reed particles;

(2) biomass charcoal (which has a particle size of 100-150 microns) loading a W oxide and a Ni oxide, iron oxyhydroxide, the reed particles in the step (1) and sulfur are uniformly mixed according to a mass ratio of 2:2:100:0.4, thereby obtaining a mixture; and the mixture is added into vegetable oil, thereby obtaining a slurry with a biomass content of 30 wt %; and (3) hydrogen with a pressure of 20 MPa and a temperature of 70 DEG C. is injected into the slurry for the first time till the volume ratio of the high-pressure hydrogen to the slurry is 100:1, the slurry is heated to 250 DEG C. in a heat exchanger, and hydrogen with a pressure of 20 MPa and a temperature of 250 DEG C. is injected into the slurry for the second time till the volume ratio of the twice injected hydrogen to the slurry reaches 900:1, thereby forming a reaction raw material mixture; the reaction raw material mixture is heated to 430 DEG C. and then is fed into a slurry bed reactor to undergo hydrolysis, cracking and hydrogenation reactions under a pressure of 20 MPa and a temperature of 450 DEG C., and in such reacting procedure, cold hydrogen with a temperature of 120 DEG C. is injected via four injection ports which are sequentially formed in a height direction in a side wall of the slurry bed reactor, wherein a total gas speed in the slurry bed reactor is controlled at 0.06 m/s, and the catalyst stored in the slurry bed reactor is controlled in an amount of 25 wt % of the total mass of the liquid phase and the solid phase in the slurry bed reactor; after the reactions are carried out for 60 min, materials discharged from the slurry bed reactor are fed into a separation system to undergo gas, liquid and residue separation, thereby obtaining a biomass gas, a bio-oil and residues, respectively; and the hydrogen in the reaction system is recycled and is fed into each hydrogen injection site in the step (3) together with fresh supplementary hydrogen.

Embodiment 4

A one-pot liquefaction process for biomass, provided by this embodiment, comprises the following steps:

(1) wheat straw is fed into a drier to be dried to produce dried wheat straw with a moisture content of 7 wt %, the dried wheat straw is crushed in a crusher to produce crushed wheat straw with a particle size of 1,500-2,000 microns, and dust is removed from the crushed wheat straw to produce straw particles;

(2) biomass charcoal (which has a particle size of 50-100 microns) loading a Pd oxide and a Ni oxide, iron oxyhydroxide, the straw particles in the step (1) and sulfur are uniformly mixed according to a mass ratio of 2:3:100:0.3, thereby obtaining a mixture; and the mixture is added into low-temperature animal oil, thereby obtaining a slurry with a biomass content of 25 wt %; and (3) hydrogen with a pressure of 17 MPa and a temperature of 100 DEG C. is injected into the slurry for the first time till the volume ratio of the high-pressure hydrogen to the slurry is 150:1, the slurry is heated to 300 DEG C. in a heat exchanger, and hydrogen with a pressure of 17 MPa and a temperature of 300 DEG C. is injected into the slurry for the second time till the volume ratio of the twice injected hydrogen to the slurry reaches 600:1, thereby forming a reaction raw material mixture; the reaction raw material mixture is heated to 440 DEG C. and then is fed into a slurry bed reactor to undergo hydrolysis, cracking and hydrogenation reactions under a pressure of 20 MPa and a temperature of 450 DEG C., and in such reacting procedure, cold hydrogen with a temperature of 90 DEG C. is injected via four injection ports which are sequentially formed in a height direction in a side wall of the slurry bed reactor, wherein a total gas speed in the slurry bed reactor is controlled at 0.08 m/s, and the catalyst stored in the slurry bed reactor is controlled in an amount of 20 wt % of the total mass of the liquid phase and the solid phase in the slurry bed reactor; after the reactions are carried out for 40 min, materials discharged from the slurry bed reactor are fed into a separation system to undergo gas, liquid and residue separation, thereby obtaining a biomass gas, a bio-oil and residues, respectively; and the hydrogen in the reaction system is recycled and is fed into each hydrogen injection site in the step (3) together with fresh supplementary hydrogen.

Embodiment 5

A one-pot liquefaction process for biomass, provided by this embodiment, comprises the following steps:

(1) wood chips are fed into a drier to be dried to produce dried wood chips with a moisture content of 10 wt %, the dried wood chips are crushed in a crusher to produce crushed wood chips with a particle size of 4,000-5,000 microns, and dust is removed from the crushed wood chips to produce wood chip particles;

(2) iron oxyhydroxide (which has a particle size of 150-200 microns), the wood chip particles in the step (1) and sulfur are uniformly mixed according to a mass ratio of 10:100:0.2, thereby obtaining a mixture; and the mixture is added into low-temperature animal oil, thereby obtaining a slurry with a biomass content of 40 wt %; and (3) hydrogen with a pressure of 27 MPa and a temperature of 130 DEG C. is injected into the slurry for the first time till the volume ratio of the high-pressure hydrogen to the slurry is 200:1, the slurry is heated to 350 DEG C. n a heat exchanger, and hydrogen with a pressure of 27 MPa and a temperature of 300 DEG C. is injected into the slurry for the second time till the volume ratio of the twice injected hydrogen to the slurry reaches 1000:1, thereby forming a reaction raw material mixture; the reaction raw material mixture is heated to 300 DEG C. and then is fed into a slurry bed reactor to undergo hydrolysis, cracking and hydrogenation reactions under a pressure of 27 MPa and a temperature of 300 DEG C., and in such reacting procedure, cold hydrogen with a temperature of 115 DEG C. is injected via five injection ports which are sequentially formed in a height direction in a side wall of the slurry bed reactor, wherein a total gas speed in the slurry bed reactor is controlled at 0.1 m/s, and the catalyst stored in the slurry bed reactor is controlled in an amount of 30 wt % of the mass of the liquid phase in the slurry bed reactor; after the reactions are carried out for 50 min, materials discharged from the slurry bed reactor are fed into a separation system to undergo gas, liquid and residue separation, thereby obtaining a biomass gas, a bio-oil and residues, respectively; and the hydrogen in the reaction system is recycled and is fed into each hydrogen injection site in the step (3) together with fresh supplementary hydrogen.

Embodiment 6

A one-pot liquefaction process for biomass, provided by this embodiment, comprises the following steps:

(1) leaves are fed into a drier to be dried to produce dried leaves with a moisture content of 15 wt %, the dried leaves are crushed in a crusher to produce crushed leaves with a particle size of 4,000-5,000 microns, and dust is removed from the crushed leaves to produce leaf particles;

(2) the catalyst prepared in the embodiment 1, iron oxyhydroxide, the leaf particles in the step (1) and sulfur are uniformly mixed according to a mass ratio of 1:0.2:100:0.25, thereby obtaining a mixture; and the mixture is added into low-temperature vegetable oil, thereby obtaining a slurry with a biomass content of 20 wt %; and (3) hydrogen with a pressure of 25 MPa and a temperature of 135 DEG C. is injected into the slurry for the first time till the volume ratio of the high-pressure hydrogen to the slurry is 200:1, the slurry is heated to 350 DEG C. in a heat exchanger, and hydrogen with a pressure of 25 MPa and a temperature of 350 DEG C. is injected into the slurry for the second time till the volume ratio of the twice injected hydrogen to the slurry reaches 650:1, thereby forming a reaction raw material mixture; the reaction raw material mixture is heated to 400 DEG C. and then is fed into a slurry bed reactor to undergo hydrolysis, cracking and hydrogenation reactions under a pressure of 25 MPa and a temperature of 450 DEG C., and in such reacting procedure, cold hydrogen with a temperature of 100 DEG C. is injected via five injection ports which are sequentially formed in a height direction in a side wall of the slurry bed reactor, wherein a total gas speed in the slurry bed reactor is controlled at 0.1 m/s, and the catalyst stored in the slurry bed reactor is controlled in an amount of 25 wt % of the mass of the liquid phase in the slurry bed reactor; after the reactions are carried out for 15 min, materials discharged from the slurry bed reactor are fed into a separation system to undergo gas, liquid and residue separation, thereby obtaining a biomass gas, a bio-oil and residues, respectively; and the hydrogen in the reaction system is recycled and is fed into each hydrogen injection site in the step (3) together with fresh supplementary hydrogen.

Embodiment 7

A one-pot liquefaction process for biomass, provided by this embodiment, comprises the following steps:
(1) amorphous alumina (which has a particle size of 350-500 microns) loading a Mo oxide and a Ni oxide, gutter oil and sulfur are uniformly mixed according to a mass ratio of 1:100:0.1, thereby obtaining a mixture, and a slurry with a biomass (the gutter oil) content of 50 wt % is prepared; and (2) hydrogen with a pressure of 20 MPa and a temperature of 90 DEG C. is injected into the slurry for the first time till the volume ratio of the high-pressure hydrogen to the slurry is 150:1, the slurry is heated to 300 DEG C. in a heat exchanger, and hydrogen with a pressure of 20 MPa and a temperature of 300 DEG C. is injected into the slurry for the second time till the volume ratio of the twice injected hydrogen to the slurry reaches 800:1, thereby forming a reaction raw material mixture; the reaction raw material mixture is heated to 430 DEG C. and then is fed into a slurry bed reactor to undergo hydrolysis, cracking and hydrogenation reactions under a pressure of 20 MPa and a temperature of 500 DEG C., and in such reacting procedure, cold hydrogen with a temperature of 120 DEG C. is injected via five injection ports which are sequentially formed in a height direction in a side wall of the slurry bed reactor, wherein a total gas speed in the slurry bed reactor is controlled at 0.07 m/s, and the catalyst stored in the slurry bed reactor is controlled in an amount of 30 wt % of the mass of the liquid phase in the slurry bed reactor; after the reactions are carried out for 40 min, materials discharged from the from the slurry bed reactor are fed into a separation system to undergo gas, liquid and residue separation, thereby obtaining a biomass gas, a bio-oil and residues, respectively; and the hydrogen in the reaction system is recycled and is fed into each hydrogen injection site in the step (3) together with fresh supplementary hydrogen.

COMPARATIVE EXAMPLE 1

A one-pot liquefaction process for biomass, provided by this experimental example, comprises the following steps:
(1) reeds are fed into a drier to be dried to produce dried reeds with a moisture content of 5 wt %, the dried reeds are crushed in a crusher to produce crushed reeds with a particle size of 20-1,000 microns, and dust is removed from the crushed reeds to produce reed particles;

(2) biomass charcoal (which has a particle size of 100-150 microns) loading a W oxide and a Ni oxide, iron oxyhydroxide, the reed particles in the step (1) and sulfur are uniformly mixed according to a mass ratio of 2:2:100:0.4, thereby obtaining a mixture; and the mixture is added into vegetable oil, thereby obtaining a slurry with a biomass content of 30 wt %; and (3) hydrogen with a pressure of 20 MPa and a temperature of 70 DEG C. is injected into the slurry for the first time till the volume ratio of the high-pressure hydrogen to the slurry is 100:1, the slurry is heated to 250 DEG C. in a heat exchanger, and hydrogen with a pressure of 20 MPa and a temperature of 250 DEG C. is injected into the slurry for the second time till the volume ratio of the twice injected hydrogen to the slurry reaches 900:1, thereby forming a reaction raw material mixture; the reaction raw material mixture is heated to 430 DEG C. and then is fed into a slurry bed reactor to undergo hydrolysis, cracking and hydrogenation reactions under a pressure of 10 MPa and a temperature of 200 DEG C., and in such reacting procedure, cold hydrogen with a temperature of 120 DEG C. is injected via four injection ports which are sequentially formed in a height direction in a side wall of the slurry bed reactor, wherein a total gas speed in the slurry bed reactor is controlled at 0.06 m/s, and the catalyst stored in the slurry bed reactor is controlled in an amount of 25 wt % of the mass of the liquid phase in the slurry bed reactor; after the reactions are carried out for 60 min, materials discharged from the slurry bed reactor are fed into a separation system to undergo gas, liquid and residue separation, thereby obtaining a biomass gas, a bio-oil and residues, respectively; and the hydrogen in the reaction system is recycled and is fed into each hydrogen injection site in the step (3) together with fresh supplementary hydrogen.

COMPARATIVE EXAMPLE 2

A one-pot liquefaction process for biomass, provided by this experimental example, comprises the following steps:
(1) reeds are fed into a drier to be dried to produce dried reeds with a moisture content of 5 wt %, the dried reeds are crushed in a crusher to produce crushed reeds with a particle size is 20-1000 microns, and dust is removed from the crushed reeds to produce reed particles;

(2) biomass charcoal (which has a particle size of 100-150 microns) loading a W oxide and a Ni oxide, iron oxyhydroxide, the reed particles in the step (1) and sulfur are uniformly mixed according to a mass ratio of 2:2:100:0.4, thereby obtaining a mixture; and the mixture is added into a vegetable oil, thereby obtaining a slurry with a biomass content of 30 wt %; and (3) hydrogen with a pressure of 20 MPa and a temperature of 70 DEG C. is injected into the slurry for the first time till the volume ratio of the high-pressure hydrogen to the slurry is 100:1, the slurry is heated to 250 DEG C.

TABLE 1

Process Effects

|  | Embodiment 1 | Embodiment 2 | Embodiment 3 | Embodiment 4 | Embodiment 5 | Embodiment 6 | Comparative Example 1 | Comparative Example 2 |
|---|---|---|---|---|---|---|---|---|
| Conversion Rate of Biomass (%) | 96 | 95 | 92 | 90 | 91 | 99 | 80 | 76 |
| Yield of Bio-oil (%) | 63 | 71 | 69 | 61 | 64 | 85.6 | 50 | 52 |
| Rate of Coke Formation (%) | 0.07 | 0.06 | 0.03 | 0.04 | 0.04 | 0.01 | 2 | 3 |
| C Content of Bio-oil (%) | 87 | 86 | 88 | 87 | 85 | 87 | 75 | 77 |
| H Content of Bio-oil | 9.1 | 8.9 | 9.2 | 9.6 | 9.5 | 10.1 | 8.2 | 7.9 |
| O Content of Bio-oil | 2.9 | 4.1 | 2.4 | 2.8 | 4.8 | 2.1 | 16 | 15 | in a heat exchanger, and hydrogen with a pressure of 20 MPa and a temperature of 250 DEG C. is injected into the slurry for the second time till the volume ratio of the twice injected hydrogen to the slurry reaches 900:1, thereby forming a reaction raw material mixture; the reaction raw material mixture is heated to 430 DEG C. and then is fed into a slurry bed reactor to undergo hydrolysis, cracking and hydrogenation reactions under a pressure of 20 MPa and a temperature of 450 DEG C., and in such reacting procedure, cold hydrogen with a temperature of 120 DEG C. is injected via four injection ports which are sequentially formed in a height direction in a side wall of the slurry bed reactor, wherein a total gas speed in the slurry bed reactor is controlled at 0.06 m/s, and the catalyst stored in the slurry bed reactor is controlled in an amount of 25 wt % of the mass of the liquid phase in the slurry bed reactor; after the reactions are carried out for 60 min, materials discharged from the slurry bed reactor are fed into a separation system to undergo gas, liquid and residue separation, thereby obtaining a biomass gas, a bio-oil and residues, respectively; and the hydrogen in the reaction system is recycled and is fed into each hydrogen injection site in the step (3) together with fresh supplementary hydrogen.

EXPERIMENTAL EXAMPLE

Results for evaluating the effects of the processes provided by the embodiments 1-7 and the comparative examples 1-2 of the present invention are shown in table 1.

As shown in table 1, it can be clearly known that the conversion ratio of the biomass and the yield of the bio-oil in the embodiments 1-6 are remarkably better than those in the comparative examples 1-2, and the rates of coke formation in the embodiments 1-6 are remarkably lower than those in the comparative examples 1-2; and the contents of C and H in the bio-oil in the embodiments 1-6 are remarkably higher than those in the comparative examples 1-2, but the contents of O in the bio-oil in the embodiments 1-6 are remarkably lower than those in the comparative examples 1-2; and through comparisons between the embodiments 1-6 and the comparative examples 1-2, the one-pot liquefaction process for biomass, disclosed by the present invention, is remarkably better than the existing biomass liquefaction process.

Apparently, the above-described embodiments are merely examples for the clarity of the description, but are not intended to be limiting on the implementations of the present invention. For those having ordinary skill in the art, variations or changes in different forms can be made on the basis of the above description. All implementations are not required to and cannot be exhaustive herein. Any derived obvious variations or changes still fall within the protection scope of the present invention.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A one-pot liquefaction process for biomass, comprising the following steps:
    preparing a slurry containing a catalyst, a vulcanizing agent, and a biomass;
    injecting high-pressure hydrogen into the slurry until the volume ratio of the high-pressure hydrogen to the slurry is 600-1500:1, thereby obtaining a reaction raw material mixture, wherein the high-pressure hydrogen has a pressure of 13-27 MPa;
    heating said reaction raw material mixture to 320-450° C. to obtain a heated reaction raw material mixture;
    feeding said heated reaction raw material mixture into a slurry bed reactor;
    subjecting the heated reaction raw material mixture to hydrolysis, cracking, and hydrogenation reactions in the slurry bed reactor, wherein said hydrolysis, cracking, and hydrogenation reactions are carried out under a pressure of 13-25 MPa and a temperature of 300-500° C.; and injecting cold hydrogen into the slurry bed reactor while said hydrolysis, cracking, and hydrogenation reactions take place, wherein a total gas speed in the slurry bed reactor is controlled within 0.02-0.2 m/s and wherein the cold hydrogen has a temperature of 60-135° C.

2. The one-pot liquefaction process for biomass according to claim 1, wherein the catalyst comprises:
amorphous alumina loading a first active component, or
biomass charcoal loading a first active component,
wherein the first active component is selected from the group consisting of group VIB metal oxides, group VIIB metal oxides, group VIII metal oxides, and mixtures thereof.

3. The one-pot liquefaction process for biomass according to claim 2, wherein the catalyst further comprises:
amorphous iron oxyhydroxide, and/or
biomass charcoal loading a second active component,
wherein the second active component is selected from the group consisting of Mo oxides, W oxides, Fe oxides, Co oxides, Ni oxides, Pd oxides, and mixtures thereof.

4. The one-pot liquefaction process for biomass according to claim 1, wherein the slurry has a biomass content of 10-50 wt %.

5. The one-pot liquefaction process for biomass according to claim 1, wherein the catalyst is present in an amount of 1-10 wt %, of the mass of the biomass; and the catalyst has a particle size of 5-500 microns.

6. The one-pot liquefaction process for biomass according to claim 1, wherein the slurry is prepared by:
Method (I): separately adding the catalyst and the vulcanizing agent into a liquid biomass to form the slurry, wherein the liquid biomass comprises one or more selected from the group consisting of vegetable oil, animal oil, gutter oil, and animal wastes; or
Method (II): drying a solid biomass to produce a dried solid biomass, crushing the dried solid biomass to produce a crushed solid biomass, removing dust from the crushed solid biomass to produce a de-dusted solid biomass, and mixing the de-dusted solid biomass with the catalyst and the vulcanizing agent to obtain a mixture; and adding the mixture to an oil product, thereby forming the slurry, wherein the oil product comprises one or more selected from the group consisting of vegetable oil, animal oil, coal tar, and petroleum.

7. The one-pot liquefaction process for biomass according to claim 6, wherein when the slurry is prepared by Method (II) of claim 6, the dried solid biomass has a moisture content of 3-15 wt % and
the crushed solid biomass has a particle size of 1-5,000 microns.

8. The one-pot liquefaction process for biomass according to claim 1, wherein the total gas speed in the slurry bed reactor is controlled within 0.05-0.08 m/s.

9. The one-pot liquefaction process for biomass according to claim 1, wherein said injecting the high-pressure hydrogen into the slurry comprises:
injecting high-pressure hydrogen into the slurry until the volume ratio of the high-pressure hydrogen to the slurry is 50-200:1,
heating the slurry to a temperature from 200° C. to- less than 320° C., and injecting additional high-pressure hydrogen into the slurry until the volume ratio of the high-pressure hydrogen to the slurry is 600-1500:1.

10. The one-pot liquefaction process for biomass according to claim 1, wherein the cold hydrogen is injected via 3-5 injection ports which are sequentially formed in a height direction in a side wall of the slurry bed reactor.

11. The one-pot liquefaction process for biomass according to claim 1, wherein the amount of the catalyst in the slurry bed reactor is 5-30 wt % of the mass of the liquid phase of the slurry in the slurry bed reactor; and
the hydrolysis, cracking, and hydrogenation reactions are carried out for a period of 15-90 min.

12. The one-pot liquefaction process for biomass according to claim 2, wherein the slurry has a biomass content of 10-50 wt %.

13. The one-pot liquefaction process for biomass according to claim 3, wherein the slurry has a biomass content of 10-50 wt %.

14. The one-pot liquefaction process for biomass according to claim 2, wherein the catalyst is present in an amount of 1-10 wt % of the mass of the biomass; and the catalyst has a particle size of 5-500 microns.

15. The one-pot liquefaction process for biomass according to claim 3, wherein the catalyst is present in an amount of 1-10 wt % of the mass of the biomass; and the catalyst has a particle size of 5-500 microns.

16. The one-pot liquefaction process for biomass according to claim 4, wherein the catalyst is present in an amount of 1-10 wt % of the mass of the biomass; and the catalyst has a particle size of 5-500 microns.

17. The one-pot liquefaction process for biomass according to claim 9, wherein the cold hydrogen is injected via 3-5 injection ports which are sequentially formed in a height direction in a side wall of the slurry bed reactor.

18. The one-pot liquefaction process for biomass according to claim 9, wherein the amount of the catalyst in the slurry bed reactor is 5-30 wt % of the mass of the liquid phase of the slurry in the slurry bed reactor; and
the hydrolysis, cracking, and hydrogenation reactions are carried out for a period of 15-90 min.

19. The one-pot liquefaction process for biomass according to claim 10, wherein the amount of the catalyst in the slurry bed reactor is 5-30 wt % of the mass of the liquid phase of the slurry in the slurry bed reactor; and
the hydrolysis, cracking, and hydrogenation reactions are carried out for a period of 15-90 min.

20. The one-pot liquefaction process for biomass according to claim 1, wherein the slurry has a biomass content of 30-40 wt %.

21. The one-pot liquefaction process for biomass according to claim 5, wherein the catalyst is present in an amount of 1-4 wt % of the mass of the biomass.

22. The one-pot liquefaction process for biomass according to claim 7, wherein the dried solid biomass has a moisture content of 510 wt %.

23. The one-pot liquefaction process for biomass according to claim 7, wherein the crushed solid biomass has a particle size of 20-1,500 microns.

24. The one-pot liquefaction process for biomass according to claim 2, wherein the slurry has a biomass content of 30-40 wt %.

25. The one-pot liquefaction process for biomass according to claim 3, wherein the slurry has a biomass content of 30-40 wt %.

26. The one-pot liquefaction process for biomass according to claim 14, wherein the catalyst is present in an amount of 1-4 wt % of the mass of the biomass.

27. The one-pot liquefaction process for biomass according to claim 15, wherein the catalyst is present in an amount of 1-4 wt % of the mass of the biomass.

28. The one-pot liquefaction process for biomass according to claim 16, wherein the catalyst is present in an amount of 1-4 wt % of the mass of the biomass.

\* \* \* \* \*